(12) United States Patent
Jamison et al.

(10) Patent No.: US 10,323,169 B2
(45) Date of Patent: Jun. 18, 2019

(54) WELLBORE TREATMENT FLUIDS CONTAINING NANO-CARBOHYDRATE BASED SHEETS AND METHODS OF USING THE SAME

(71) Applicant: Halliburton Energy Services, Inc., Houston, TX (US)

(72) Inventors: Dale E. Jamison, Humble, TX (US); Cato Russell McDaniel, The Woodlands, TX (US); Lee J. Hall, Conroe, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 291 days.

(21) Appl. No.: 14/907,587

(22) PCT Filed: Sep. 4, 2013

(86) PCT No.: PCT/US2013/058003
§ 371 (c)(1),
(2) Date: Jan. 26, 2016

(87) PCT Pub. No.: WO2015/034479
PCT Pub. Date: Mar. 12, 2015

(65) Prior Publication Data
US 2016/0160106 A1 Jun. 9, 2016

(51) Int. Cl.
*C09K 8/512* (2006.01)
*C09K 8/035* (2006.01)
(Continued)

(52) U.S. Cl.
CPC .............. *C09K 8/035* (2013.01); *C09K 8/512* (2013.01); *C09K 8/514* (2013.01); *C09K 8/516* (2013.01);
(Continued)

(58) Field of Classification Search
CPC ....... E21B 21/003; E21B 33/138; C09K 8/03; C09K 2208/10; C09K 8/512
See application file for complete search history.

(56) References Cited

U.S. PATENT DOCUMENTS

| 2,805,991 A | 9/1957 | Tailleur |
| 4,369,844 A | 1/1983 | Clear |

(Continued)

FOREIGN PATENT DOCUMENTS

| WO | WO-1996/031339 | 10/1996 |
| WO | WO-2015/034479 | 3/2015 |

OTHER PUBLICATIONS

"Nano Cellulose Fibers from Root Vegetables", http://www.cellucomp.com/products.html#Curran, 4 pgs, Sep. 2013.
(Continued)

*Primary Examiner* — Catherine Loikith
(74) *Attorney, Agent, or Firm* — Polsinelli PC

(57) ABSTRACT

A wellbore treatment fluid containing lost circulation materials and methods for using the treatment fluid, the fluid including a carrier fluid and nano-carbohydrate based sheets. The sheets may be folded or rolled into various cross-sectional surface area reducing configurations. The nano-carbohydrate based sheets may contain cellulose and or chitin materials. A method for utilizing the treatment fluid for creation or maintenance of a well includes forming or providing the treatment fluid and introducing the treatment fluid into a borehole.

26 Claims, 3 Drawing Sheets

(51) Int. Cl.
*C09K 8/516* (2006.01)
*E21B 21/00* (2006.01)
*C09K 8/514* (2006.01)
*E21B 33/138* (2006.01)

(52) U.S. Cl.
CPC .......... *E21B 21/003* (2013.01); *E21B 33/138* (2013.01); *C09K 2208/10* (2013.01)

(56) References Cited

U.S. PATENT DOCUMENTS

| | | | |
|---|---|---|---|
| 9,725,635 B2* | 8/2017 | Savari | C09K 8/035 |
| 2003/0234103 A1 | 12/2003 | Lee et al. | |
| 2004/0129460 A1 | 7/2004 | MacQuoid | |
| 2009/0124522 A1* | 5/2009 | Roddy | C04B 7/527 |
| | | | 507/269 |
| 2010/0065236 A1 | 3/2010 | Henriksson et al. | |
| 2013/0196883 A1 | 8/2013 | Rincon-Torres et al. | |
| 2013/0226473 A1 | 8/2013 | Murphy et al. | |
| 2013/0314241 A1 | 11/2013 | Jamison et al. | |

OTHER PUBLICATIONS

"PCT International Search Report and Written Opinion", dated Jun. 16, 2014, Appl No. PCT/US2013/058003, "Nano-Carbohydrate Composites as a Lost Circulation Materials—LCM Origami and Other Drilling Fluid Applications," filed Sep. 4, 2013, 16 pgs.

Ifuku, Shinsuke et al., "Preparation of Chitin Nanofibers with a Uniform Width as Chitin from Crab Shells", Biomacromolecules 10, 2009, 5 pgs.

Muzzarelli, Riccardo A. et al., "Chitin Nonfibrils", Chitin and Chitosan: Research Opportunities and Challenges, edited by P.K. Dutt, New Age International, New Delhi, India, 2005, 21 pgs.

Simonson, John "Cellulose Nanocrystals", http://www.cof.orst.edu/cof/wse/faculty/simonsen/#RESEARCH%20AREAS, 7 pgs, Sep. 2003.

* cited by examiner

WELLBORE TREATMENT FLUIDS CONTAINING NANO-CARBOHYDRATE BASED SHEETS AND METHODS OF USING THE SAME

BACKGROUND

Treatment fluids can be employed in a variety of subterranean operations. As used herein the terms "treatment," "treating," other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Illustrative subterranean operations that can be performed using treatment fluids can include, for example, drilling operations, fracturing operations, sand control operations, gravel packing operations, acidizing operations, conformance control operations, fluid diversion operations, fluid blocking operations, and the like.

Treatment for fluid-loss control can be used during any of drilling, completion, and intervention operations. During completion or intervention, stimulation is a type of treatment performed to enhance or restore the productivity of oil or gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production, and controlling sand or fines production. Still other types of completion or intervention treatments include, but are not limited to, damage removal, formation isolation, wellbore cleanout, scale removal, and scale control.

Different types of "lost circulation materials" (hereinafter "LCM") may be used. These include cellulose and chitin. Cellulose is the world's most abundant biopolymer on earth. It is natural, renewable, and biodegradable. It is synthesized by plants as well as by some specialized bacteria. Its molecular structure is constituted by a linear backbone of $\beta$-1, 4-O-glycosyl linked D-glucose residues bundled up in a microfiber. The cellulose microfiber varies in length depending on the cellulose species.

Chitin is a natural biopolymer material found in the protective exoskeletons of arthropods (insects, spiders, crustaceans such as crab, shrimp, etc.). Exoskeletons represent a natural composite material having a hierarchical structure containing proteins and minerals along with chitin. This chitin provides reinforcement of the protein matrix in the arthropods' shells.

Cellulose, chitin and its derivative chitosan have been used in certain drilling applications, such as an additive to drilling fluids. However, such applications have either utilized small particles of the cellulose fibers or chitin shells without regard to the nanofiber physical composition or arrangement. Accordingly, such methods have not made the most beneficial use of cellulose, chitin or chitosan.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The present invention generally relates to the use of LCMs in subterranean operations, and, more specifically, to the use of nano-carbohydrate composites in wellbore fluids as LCMs during subterranean operations.

A novel use of nano-carbohydrate LCMs is to utilize materials in a sheet form that may be folded, rolled, shredded, torn or cut into useful shapes for use in downhole applications.

Another novel use of nano-carbohydrate LCM is to provide containers for shearing downhole to deliver chemistries and make composite LCMs.

A further novel use of nano-carbohydrate LCMs is to provide sack materials for products that can be shredded at the rig site and used directly as LCMs downhole.

Several advantages the nano-carbohydrate based sheets offer are strengths and Young's moduli that were unobtainable in the past. Additionally, the nano-carbohydrate based sheets may be made with materials that can be removed with acids, enzymes, etc. In some embodiments, they may provide suspension and or prevent sag. Further, the LCMs outlined in this disclosure may be sourced from waste material. In some embodiments, to manufacture them, they require only simple processing and are chemically non-toxic.

Nano-carbohydrate Based Sheet Configurations

Flat Origami Structures

Figure 1:
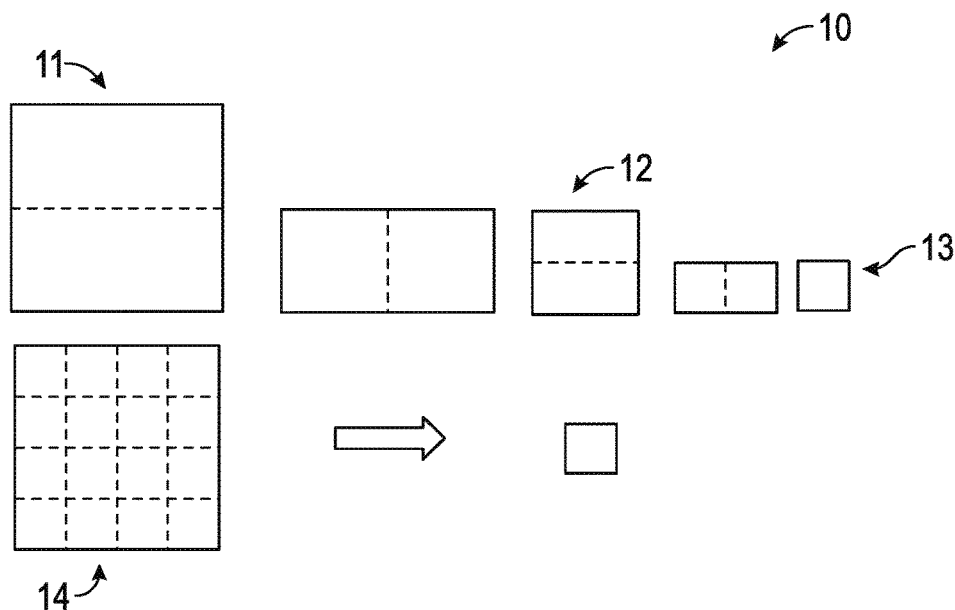
FIG. 1 shows an illustrative example of a flat origami LCM.

As illustrated in FIG. 1, one embodiment 10 of the present invention utilizes nano-carbohydrate based sheets 11 that have been folded into a flat "origami" type of structure 13. This compact configuration allows the folded sheet to be pumped downhole at a fraction of the original cross-sectional area, thereby delivering a concentrated LCM to a targeted portion of the wellbore without altering the rheological properties of the carrier fluid as a powder may alter it. In several embodiments, the folded flat configuration may be achieved by folding the sheet in half at least one time. In one embodiment, a square shaped nano-carbohydrate based sheet 11 is folded in half twice 12, thereby reducing its cross-sectional area by 75%. In another embodiment, the sheet 12 is further folded in half two more times, thereby reducing its cross-sectional area to 1/16 of the original cross-sectional area 14. In certain embodiments, any shape of nano-carbohydrate based sheet may be folded at least once to reduce the cross-sectional area. The fold may be in half, or may be any fold that reduces the cross-sectional area of the sheet.

Folded 3-D Structures

Figure 2:
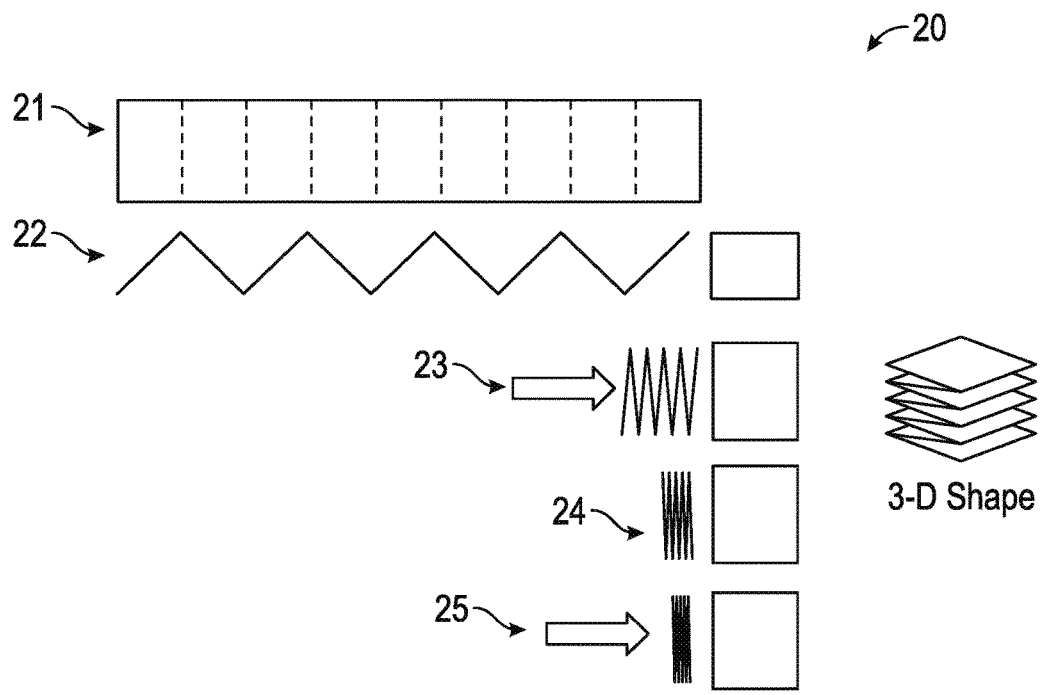
FIG. 2 shows an illustrative example of a folded, 3-D LCM in various states of deployment.

In FIG. 2, one embodiment of the folded 3-D structure of the nano-carbohydrate based sheet is illustrated. In an illustrative embodiment 20, the sheet 21 is folded into an accordion pleating configuration 22. The folds do not need to be uniform, but uniform folds may result in a more compact structure when the sheet is compressed. The compressed accordion pleated sheet 25 is sent downhole to a treatment zone. In an embodiment, the compressed sheet 25 opens 23, 24 due to at least one of pressure, time, shear, pH, and the elevated downhole temperature, and combinations thereof. In another embodiment, the compressed sheet opens due to the amount of time downhole. In a further embodiment, the compressed sheet opens due to increased downhole temperatures. The compressed sheet 25 may open partially 22, 23, 24 or fully back to its original cross-sectional area 21. In an embodiment, the uncompressed sheet cross-section has at least doubled from its compressed size.

Rolled 3-D Structures

Figure 3:
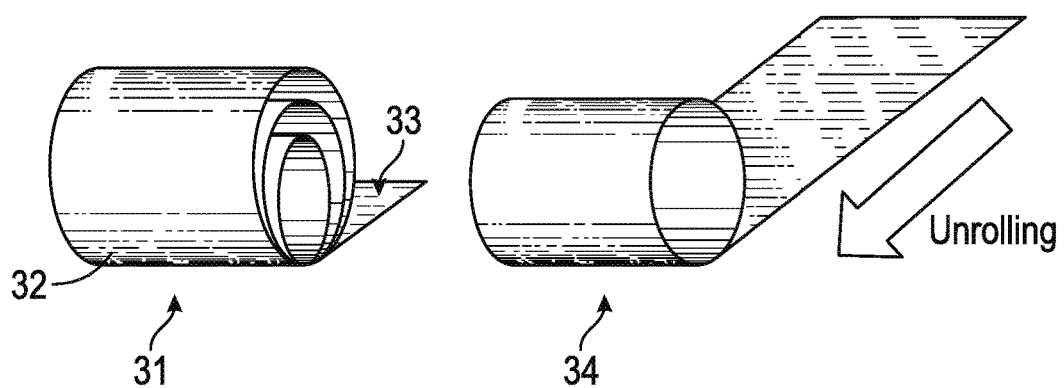
FIG. 3 shows an illustrative example of a rolled, 3-D LCM in various states of deployment.

As illustrated in FIG. 3, some embodiments of the nano-carbohydrate based sheets are directed to a rolled 3-D structure 31. In one embodiment, a paper-like nano-carbonate sheet 32 is backed by a polymer 33 and the two-layered structure is rolled into a rolled 3-D structure 31. Upon exposure to an appropriate, solvent, the scroll unrolls 34 if the polymer component swells. In one embodiment, the polymer 33 is present in a continuous coating along the back of the rolled 3-D structure 31. In some embodiments, the polymer is present as a coating on at least one portion of one side of the nano-carbohydrate based sheets. In other embodiments, the polymer 33 is present as a coating on at least one portion of the back surface of the rolled 3-D structure 31. In various embodiments, the variables that may be changed are the helical dimensions, such as aspect ratio and the tightness of the roll, the moduli of the paper phase, the moduli of the polymer phase, and the swelling of the polymer in a given solvent. Changes to any of the preceding variables may be made to design different shapes that may be pumped downhole and then deploy downhole into a different shape. In an embodiment, the rolled 3-D structure 31 opens 34 due to at least one of solvent cause the polymer to swell, pressure, time, shear, pH, and the elevated downhole temperature, and combinations thereof.

Container Forms

The present invention also provides improved methods for using the nano-carbohydrate based sheets to deliver chemicals downhole to treat a region of a well. The nano-carbohydrate based sheets are used to encapsulate the chemicals, or provide containers to deliver the chemicals downstream. In some embodiments, the chemicals may be solids or liquids. In certain embodiments, the case of solids, a pouch or container constructed of nano-carbohydrate based sheets may be used without an additional coating on the solid materials. Exemplary but not limiting examples of the shapes of the containers are spherical, ovoid, square, rectangular, triangular, circular, or cylindrical. In the case of liquids, an additional encapsulating material may be necessary, thereby forming a capsule with a membrane as its outer surface. Isolation of the encapsulated material from the carrier fluid and the downhole environment by the nano-carbohydrate based sheet containers provides several advantages. For example, using encapsulated well treatment chemicals permits blending of normally incompatible compounds in the carrier fluid. As an example, the present invention permits the transport of an acid compound to a downhole environment by a carrier fluid having a neutral or basic pH without detrimentally impacting either the carrier fluid or the acid. Even though the acid may be in a separate capsule, the nano-carbohydrate based sheet containers may provide extra protection for the capsule on its way to the downhole treatment site. A non-limiting list of mechanisms suitable for releasing the encapsulated fluid includes: a change in pH, crushing, rupture, dissolution of the membrane, diffusion and/or thermal melting of the encapsulating membrane. Following placement of the liquids downhole, the liquids are then released from the capsules and allowed to react. A non-exclusive list of common well treatment chemicals and additives includes: acid etching agents, scale inhibitors, corrosion inhibitors, biocides, paraffin and asphaltene inhibitors, H2S scavengers, oxygen scavengers, demulsifiers, clay stabilizers; surfactants, acidizing agents and mixtures thereof. The controlled downhole release of these chemicals will significantly improve their functionality.

Bag Forms

In some embodiments of the invention, the nano-carbohydrate based sheets are made into bags or sacks and used to transport drilling materials to the rig site. The bags may be any size or shape, and in illustrative embodiments hold 20-50 lbs of drilling fluid materials. For example, sodium montmorillonite (bentonite), available from Baroid, a Halliburton Company, of Houston, Tex., under the trademark AQUAGEL™, is available in 50 pound sacks. These delivery sacks may be made of nano-carbohydrate based sheets according to the present invention. When the drilling mud is being mixed, the bags may be shredded into, or by, the mixing hopper. The bentonite may act a viscosifier, and the nano-carbohydrate based sheet bag would act as a LCM additive.

Fluids Including Nano-carbohydrate Based Sheets

In some embodiments, fluids of the present invention include a carrier fluid and nano-carbohydrate based sheets. The resulting fluid may be referred to as a treatment fluid, and may include additional additives. In certain embodiments, the carrier fluid is aqueous based. In other embodiments, the carrier fluid is oil-based. In an illustrative example, one or more of the disclosed nano-carbohydrate based sheets may be added to a carrier fluid via a mixing hopper. This hopper may be coupled to a retention pit, thereby holding the treatment fluid until it is pumped downhole. Additional additives may be added with the nano-carbohydrate based sheets to the mixing hopper along with the nano-carbohydrate based sheets, or at a different time than the nano-carbohydrate based sheets. In other embodiments, the nano-carbohydrate based sheets may be added to the carrier fluid at any other location in the drilling assembly.

In various embodiments, the treatment fluids may be provided or formed at the well site, or at a remote site. In another embodiment, the combining of the carrier fluid and the nano-carbohydrate based sheets may occur at a site away from the well. This combination may be added to additional materials at the well site to form the treatment fluid.

In some embodiments, the treatment fluid components may be combined by introducing a continuously flowing stream of one material into the flowing stream of another material so that the streams are combined and mixed while continuing to flow as a single stream as part of the well treatment.

In certain embodiments, the nano-carbohydrate based sheets are present as the material making-up the bags used to transport other materials to the rig site. In an embodiment, these bags are shredded or chopped before they are added to the mixing hopper. In one embodiment, the mixing hopper shreds or chops the nano-carbohydrate based sheet bags in the mixing hopper. In some embodiments, the nano-carbohydrate based sheet bags are added to the chopping and mixing hopper without removing the contents of the bags.

The nano-carbohydrate based sheets present in the wellbore treatment fluid may be present in any effective amounts. Typically, the type of treatment fluid, the well conditions, and the type of treatment determine the amount of nano-carbohydrate based sheets that are necessary. In one embodiment, the nano-carbohydrate based sheets are present in the treatment fluid in an amount of from about 0.1 wt % to about 5.0 wt % of the treatment fluid.

Fluids

Every fluid inherently has at least a continuous phase. A fluid can have more than one phase. The continuous phase of a well fluid is a liquid under standard laboratory conditions. For example, a well fluid can in the form of be a suspension (solid particles dispersed in a liquid phase), an emulsion (liquid particles dispersed in another liquid phase), or a foam (a gas phase dispersed in liquid phase). As used herein, a "water-based" means that water or an aqueous solution is the continuous phase of the substance. In contrast, "oil-based" means that oil is the continuous phase of the substance. In this context, the oil of an oil-based fluid can be any oil. In general, an oil is any substance that is liquid standard laboratory conditions, is hydrophobic, and soluble in organic solvents. Oils have a high carbon and hydrogen content and are relatively non-polar substances, for example, having a polarity of 3 or less on the Synder polarity index. This general definition includes classes such as petrochemical oils, vegetable oils, and many organic solvents. All oils can be traced back to organic sources.

Carrier Fluids

In several embodiments, an aqueous carrier fluid may be used. The aqueous carrier fluid of the present embodiments can generally be from any source, provided that the fluids do not contain components that might adversely affect the stability and/or performance of the treatment fluids of the present invention. In various embodiments, the aqueous carrier fluid can comprise fresh water, acidified water, salt water, seawater, brine, or an aqueous salt solution. In some embodiments, the aqueous carrier fluid can comprise a monovalent brine or a divalent brine. Suitable monovalent brines can include, for example, sodium chloride brines, sodium bromide brines, potassium chloride brines, potassium bromide brines, and the like. Suitable divalent brines can include, for example, magnesium chloride brines, calcium chloride brines, calcium bromide brines, and the like.

In some embodiments, the aqueous carrier fluid is present in the treatment fluid the amount of from about 85% to about 98% by volume of the treatment fluid. In another embodiment, the aqueous carrier fluid is present in the amount of from about 90% to about 98% by volume of the treatment fluid. In further embodiments, the aqueous carrier fluid is present in the amount of from about 94% to about 98% by volume of the treatment fluid.

In several embodiments, the carrier fluid is a non-aqueous based carrier fluid. In one embodiment, the carrier fluid is an oil-based drilling fluid. The oil based drilling fluid is may be present in the treatment fluid in the amount of from about 85% to about 98% by volume of the treatment fluid.

Cellulose Based Nano-carbohydrates

A cellulose microfiber contains a crystalline part, which is highly insoluble in water, and some non-crystalline parts, which have been referred to as amorphous cellulose. The crystalline cellulose is able to make a strong network, which is believed to be based on inter-molecular hydrogen-bonding. However, in its most common natural state, cellulose microfibers show an amorphous region. The amorphous region of the cellulose microfibers allows for water to penetrate.

The "Young's modulus" of a fiber is the stiffness of the sample, defined as the amount of axial load (or stress) sufficient to make the formation sample undergo a unit amount of deformation (or strain) in the direction of load application, when deformed within its elastic limit. The higher the Young's modulus, the harder it is to deform. It is an elastic property of the material and is usually denoted by the English alphabet E having units the same as that of stress. In some embodiments of the present invention, the crystalline portions of the cellulose microfibers can have a Young's Modulus in the range of about 110 to about 220 GPa with a tensile strength of about 7.5 to about 7.7 GPa.

Cellulose nanofibers or nanocrystalline cellulose, can be produced from natural cellulose by partial acid hydrolysis (e.g., with strong acids such as $H_2SO_4$ or HCl), which targets only the amorphous cellulose to render only crystalline, non-woven, cellulose microfibers. The length of the nanofibers varies in the range from about 100 nanometers to about one micron (1,000 nm). The width of the nanofibers varies the range of about 30 nm to about 50 nm. Cellulose nanofibers may be obtained commercially. One example useful in the present invention is CURRAN®, available from CelluComp Ltd., Burntisland, Fife, UK. CURRAN® is available in paste, slurry, sheet, powder, and tag form.

Cellulose based nano-carbohydrate sheets may be formed by various processes. In one embodiment, the nanofibers are present in an aqueous solvent dispersion and are transferred onto an organic polymer matrix. The sheets are formed by solution casting, which allows the solvent to evaporate. Additional methods for creating sheets include, but are not limited to, forming via filtration, where polymer is added by at least one of several methods such as hot press (roll-to-roll), solution casting, and vapor deposition (compositions like paraylene).

In some embodiments, the presence of hydroxyl groups on the surface of the nano-carbohydrate sheets makes this material amenable for a variety of chemically substituted with an organic compound or grafted with a polymer. It is possible, thus, to make organic substitutions that would allow the nanofibers in the nano-carbohydrate sheets to be cross-linked. For example, selective oxidation of the primary alcohol (R—$CH_3$—OH) group on the cellulose surface to the carboxylic acid (R—COOH) could be used to couple to amine groups (R—$NH_2$) attached to other chemical additives, forming a bridge covalent bond (an amide bond). In another example, two nearby carboxyl groups could be treated with a base to form carboxylate anions (R—$COO^-$) which in turn could be ionically bridged by a divalent cation such as $Ca^{2+}$ or $Mg^{2+}$. Such a polymer network bridged by electrostatic forces would allow the nanofibers on the nano-carbohydrate sheets to be cross-linked when exposed to a change in certain critical conditions. For certain applications in well services, the ionic cross-linking mechanism can be adapted to be reversible so that it can be switched off on demand (e.g., by the addition of acid to change pH or switching from divalent to monovalent brine) to break the viscosity of the well fluid.

In certain embodiments, chemical functionalization of the nano-carbohydrate sheets can be used to optimize the properties in various well fluid applications, including for oil-based fluids such as drilling fluids and for water or oil-based emulsions. For example, the addition of a phenyl substituent (R—$C_6H_5$) or long chain alkyl group (R—$(CH_2)_n$—$CH_3$) at any of the hydroxyl positions on the cellulose backbone would result in improved nano-carbohydrate sheet dispersibility in oil-based systems.

Chitin Based Nano-carbohydrates

The chitin and chitin derivatives utilized in certain embodiments of the nano-carbohydrate sheets of the invention are chitin nanocrystals and chitin nanocrystal derivatives. As used herein chitin nanocrystals refers to chitin free of bulk amorphous material and primarily comprised of chitin molecules stacked or bundled into three dimensional arrangements having diameter of 5 nm to 50 nm, preferably from 10 nm to 20 nm, and a length from 100 nm to 1000 nm and more typically from 200 nm to 300 nm in length. By "primarily comprised of" it is meant that the average size of the chitin nanocrystals for the entire chitin compound falls within the aforementioned diameter and length ranges and preferably over 50% of the chitin compound is composed of nanocrystals falling within the aforementioned ranges. More preferably over 75% or over 90% of the chitin compound is composed of nanocrystals falling within the aforementioned ranges. These chitin nanocrystals can have a Young's Modulus exceeding 130 GPa with a tensile strength of about 7.5 GPa. Such crystal bundles have a core of chitin molecules, which has little and generally no surface exposure and surface chitin molecules that are exposed to the surrounding environment.

Generally, such chitin nanocrystals can be isolated by a process having two primary parts. First, raw chitin is treated to remove the amorphous portions or non-chitin portion. This first part can involve acid hydrolysis and can involve bleaching and neutralizing the acid. The second part is to separate the resulting nanocrystals from their aqueous suspension, which can be by filtration, dialysis, centrifugation or spray drying. Processes for isolating chitin nanocrystals have been disclosed in Ifuku, et al., *Preparation of Chitin Nanofibers with a Uniform Width as α-Chitin from Crab Shells*, Biomacromolecules 2009, 10, 1584-1588; and Muzzarellii, et al., (2005) *Chitin nanofibrils*, In: Duta PK (ed) *Chitin and Chitosan: Research Opportunities and Challenges*, New Age, New Delhi, India.

Chitin nanocrystal derivatives refer to chemical derivatives of chitin nanocrystals by modifying or substituting one or more functional groups on the chitin nanocrystals. As described above, the chitin nanocrystals are three-dimensional crystals of ordered chitin polymer chains. The chitin nanocrystals have core chitin polymer chains and surface chitin polymer chains. In preparing derivatives of the chitin nanocrystals, generally the surface chitin molecules will have functional groups modified or substituted and the core chitin molecules will have no functional groups replaced or substituted. Thus, the chitin nanocrystal derivatives referred to herein are ones where the surface functional groups are modified or substituted and the core functional groups are substantially unmodified or unsubstituted.

The chitin nanocrystal derivatives useful in the current invention include the following: chitosan nanocrystals, oxidized chitin nanocrystal derivatives, hydrocarbon chitin nanocrystal derivatives and cross-linked chitin nanocrystal derivatives. The chitin nanocrystal derivatives have modified or substituted surface functional groups and substantially no modification or substitution of the core functional groups. In other words, the core chitin polymer chains of the nanocrystal have no or an insubstantial percentage of their functional groups modified or substituted from the hydroxyl or amide functional group of chitin. By "insubstantial" it is meant that if there is any substitution or modification of the core functional groups it is not enough to affect the chemical or physical properties of the chitin nanocrystal derivative. Generally, if there is any modification or substitution of the core functional groups, it is often less than 2% such of groups and typically less than 1%. Hydrocarbon chitin nanocrystal derivatives with alky and aryl functional groups can be utilized in non-aqueous or oil based drilling muds because the derivatives tend to be lipophilic.

Cross-linked chitin nanocrystal derivatives are hydrocarbon chitin nanocrystal derivatives that have been coupled or cross-linked such that the nanocrystals are coupled by the hydrocarbon functional group. For forming cross-linked hydrocarbon chitin nanocrystal derivatives where the hydrogen functional group is a carboxyl functional group, generally a dicarboxylic acid can be used with a suitable coupling agent to produce the cross-linked hydrocarbon chitin nanocrystal derivative. Suitable dicarboxylic acids can be selected from dicarboxylic acids having from 2 to 12 carbon atoms. Typically, suitable dicarboxylic acids can be selected from the group consisting of oxalic acid, malonic acid, succinic acid, glutaric acid, adipic acid, pimelic acid and mixtures thereof. Examples of coupling agents are 1-Ethyl-3-(3-dimethylaminopropyl)carbodiimide (EDC), N,N'-Dicyclohexylcarbodiimide (DCC) and N,N'-Diisopropylcarbodiimide (DIC). The production of cross-linked hydrocarbon chitin nanocrystal derivatives using carboxylic acids.

In certain embodiments, chitin based nano-carbohydrate sheets may be formed by various processes. In one embodiment, the nanocrystals are present in an aqueous solvent dispersion and are transferred onto an organic polymer matrix. The sheets are formed by solution casting, which allows the solvent to evaporate. Additional methods for creating sheets include, but are not limited to, forming via filtration, where polymer is added by at least one of several methods such as hot press (roll-to-roll), solution casting, and vapor deposition (compositions like paraylene).

Formation Treatment Procedures

In an embodiment, a well treatment fluid is delivered into a well within a relatively short period of time after forming the well treatment fluid. In one embodiment, the time period is within 30 minutes to one hour. In a preferred embodiment, delivering of the well treatment fluid is immediately after forming the well treatment fluid, which is "on the fly." It should be understood that delivering the well treatment fluid into the wellbore can advantageously include the use of one or more fluid pumps.

Drilling

While drilling oil and gas wells, a drilling fluid is circulated through a drill bit in a well bore and then back to the earth surface, thereby removing cuttings from the well bore. The drilling fluid is then often reconditioned and reused. In the well bore, the drilling fluid maintains a predetermined hydrostatic pressure. However, when the drill bit encounters certain unfavorable subterranean zones, the hydrostatic pressure is compromised, resulting in what is commonly known as "lost circulation." For example, lost circulation occurs when the drill bit encounters comparatively low pressure subterranean zones, such as vugs, fractures, and other thief zones. Similarly, encountering comparatively high pressure subterranean zones results in crossflows or underground blow-outs, and subsequently lost circulation.

Lost circulation requires remedial steps. Most remedial steps comprise introducing LCMs into the well bore to seal the above-described low pressure subterranean zones or high pressure subterranean zones. The nano-carbohydrate based sheet materials of the present invention may be used as LCMs in the lost circulation examples above. In one embodiment, the nano-carbohydrate based sheets are present in the treatment fluid at a concentration from about 10 wt % to about 25 wt %—of the treatment fluid, or more preferably, from about 15 wt % to about 20 wt %—of the treatment fluid.

Well Stimulation

In some embodiments such as fracturing operations, the well treatment fluid may be introduced into the subterranean formation at or above a pressure sufficient to create or enhance one or more fractures in a portion of the subterranean formation. In an embodiment, the introducing of the well treatment fluid comprises introducing it under conditions for fracturing a treatment zone. The fluid is introduced into the treatment zone at a rate and pressure that are at least sufficient to fracture the zone.

The nano-carbohydrate based sheets of the present invention may be present in the fracturing fluid when combined with a carrier fluid. In one embodiment, the nano-carbohydrate based sheets are present in the fracturing fluid at a concentration from about 10 wt % to about 25 wt %—of the fracturing fluid, or more preferably, from about 15 wt % to about 20 wt %—of the fracturing fluid.

Completion, Workover, and Kill

When conducting subterranean operations, it can sometimes become necessary to block the flow of fluids in the subterranean formation for a prolonged period of time, typically for at least about one day or more. In some cases, the period of time can be much longer, days or weeks. For example, it can sometimes be desirable to impede the flow of formation fluids for extended periods of time by introducing a kill pill or perforation pill into the subterranean formation to at least temporarily cease the communication between wellbore and reservoir production. Kill pill refers to a small amount of a treatment fluid introduced into a wellbore that blocks the ability of formation fluids to flow into the wellbore.

Generally, subterranean well completion, workover and kill operations are conducted while the well is filled with fluid. A completion, workover, or kill fluid, such as a kill pill, is commonly placed in a wellbore prior to the operation and is often maintained in the wellbore for the duration of the operation. The kill pill applies a hydrostatic pressure against the formation fluid, which is greater than the pressure exerted by the formation fluid attempting to intrude into the wellbore. This overbalanced hydrostatic pressure prevents the intrusion of formation fluids into the wellbore during performance of the given wellbore operation, which is necessary from an operational standpoint to prevent interference from formation fluids and from a safety standpoint to prevent blowouts and well kicks. In uncased wells, maintaining an overbalanced hydrostatic pressure also helps prevent the wellbore wall from caving in or sloughing into the wellbore. Other functions of kill pills agents are to minimize fluid loss from the wellbore into the surrounding formation, to help support casing and tubing strings, and to provide a medium through which completion and workover operations can be performed. Well completion operations typically include gravel packing as well as cementing operations.

The nano-carbohydrate based sheets of the present invention may be present in the kill pill when combined with a carrier fluid. In one embodiment, the nano-carbohydrate based sheets are present in the kill pill at a concentration from about 10 wt % to about 25 wt % of the kill pill, or more preferably, from about 15 wt % to about 20 wt % of the kill pill.

Treatment Fluid Additives

A well treatment fluid may contain additives that are commonly used in oil field applications, as known to those skilled in the art. These include, but are not necessarily limited to, brines, inorganic water-soluble salts, salt substitutes (such as trimethyl ammonium chloride), pH control additives, surfactants, crosslinkers, breakers, breaker aids, oxygen scavengers, alcohols, scale inhibitors, corrosion inhibitors, hydrate inhibitors, fluid-loss control additives, oxidizers, chelating agents, water control agents (such as relative permeability modifiers), consolidating agents, proppant flowback control agents, conductivity enhancing agents, clay stabilizers, sulfide scavengers, fibers, bactericides, and combinations thereof.

One of skill in the art will ascertain that nano-carbohydrate sheet based fluids offer distinct advantages such as being sourced from waste material, being manufactured with only minimum processing, and being chemically non-toxic. The finished product possesses strong mechanical properties and has good chemical compatibility.

Figure 4:
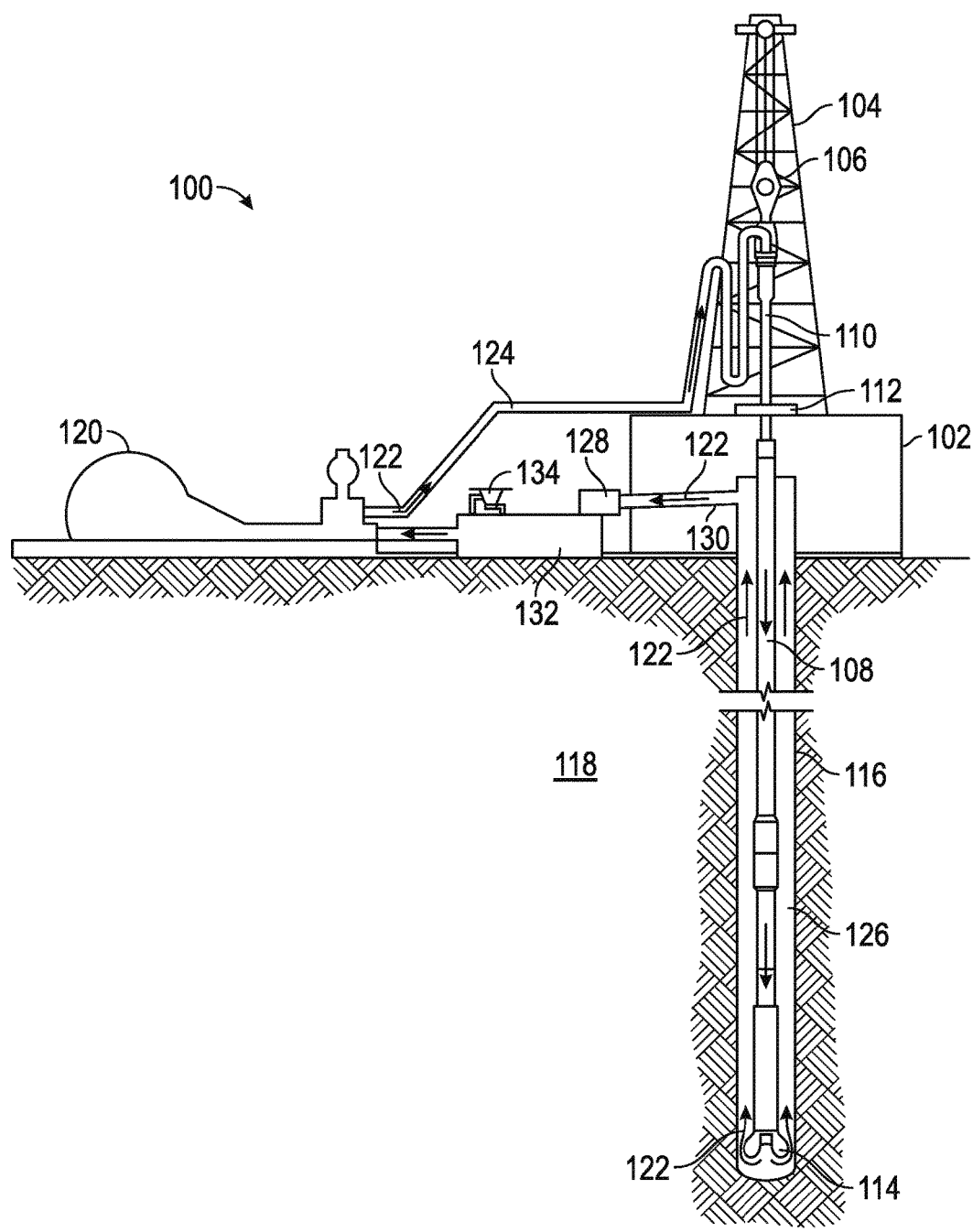
FIG. 4 shows an exemplary wellbore drilling assembly utilizing the LCMs of the present invention.

The exemplary nano-carbohydrate sheets disclosed herein may directly or indirectly affect one or more components or pieces of equipment associated with the preparation, delivery, recapture, recycling, reuse, and/or disposal of the disclosed nano-carbohydrate sheets. For example, and with reference to FIG. 4, the disclosed nano-carbohydrate sheets may directly or indirectly affect one or more components or pieces of equipment associated with an exemplary wellbore drilling assembly 100, according to one or more embodiments. It should be noted that while FIG. 4 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure.

One or more of the disclosed nano-carbohydrate sheets may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed nano-carbohydrate sheets may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the disclosed nano-carbohydrate sheets may be stored, reconditioned, and/or regulated until added to the drilling fluid 122.

As mentioned above, the disclosed nano-carbohydrate sheets may directly or indirectly affect the components and equipment of the drilling assembly 100. For example, the disclosed nano-carbohydrate sheets may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, any fluid reclamation equipment, The fluid processing unit(s) 128 may further include one or more sensors, gauges, pumps, compressors, and the like used store, monitor, regulate, and/or recondition the exemplary nano-carbohydrate sheets.

The disclosed nano-carbohydrate sheets may directly or indirectly affect the pump 120, which representatively includes any conduits, pipelines, trucks, tubulars, and/or pipes used to fluidically convey the nano-carbohydrate sheets downhole, any pumps, compressors, or motors (e.g., topside or downhole) used to drive the nano-carbohydrate sheets into motion, any valves or related joints used to regulate the pressure or flow rate of the nano-carbohydrate sheets, and any sensors (i.e., pressure, temperature, flow rate, etc.), gauges, and/or combinations thereof, and the like. The disclosed nano-carbohydrate sheets may also directly or indirectly affect the mixing hopper 134 and the retention pit 132 and their assorted variations.

The disclosed nano-carbohydrate sheets may also directly or indirectly affect the various downhole equipment and tools that may come into contact with the nano-carbohydrate sheets such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed nano-carbohydrate sheets may also directly or indirectly affect any downhole heat exchangers, valves and corresponding actuation devices, tool seals, packers and other wellbore isolation devices or components, and the like associated with the wellbore 116. The disclosed nano-carbohydrate sheets may also directly or indirectly affect the drill bit 114, which may include, but is not limited to, roller cone bits, PDC bits, natural diamond bits, any hole openers, reamers, coring bits, etc.

While not specifically illustrated herein, the disclosed nano-carbohydrate sheets may also directly or indirectly affect any transport or delivery equipment used to convey the nano-carbohydrate sheets to the drilling assembly 100 such as, for example, any transport vessels, conduits, pipelines, trucks, tubulars, and/or pipes used to fluidically move the nano-carbohydrate sheets from one location to another, any pumps, compressors, or motors used to drive the nano-carbohydrate sheets into motion, any valves or related joints used to regulate the pressure or flow rate of the nano-carbohydrate sheets, and any sensors (i.e., pressure and temperature), gauges, and/or combinations thereof, and the like.

EXAMPLES

The following muds may be formed using traditional blending methods known to those of skill in the art.

Example 1

Conventional Water-based Drilling Mud

An exemplary water-based drilling mud utilizing the nano-carbohydrate based sheets of the present invention may contain the following:
Bentonite (AQUAGEL®), viscosifier: 5-8 lb/bbl; Modified starch (DEXTRID®), filtration control: 4-6 lb/bbl; Polyanionic cellulose (PAC™-L or PAC™-R), filtration control: 1-4 lb/bbl; NaOH or KOH, alkalinity source: 0.4-1.0 lb/bbl or as needed to target pH; Calcium Carbonate (BARACARB®), bridging agent: as needed to target density and fluid loss; Barium Sulfate (BAROID®), weighting agent: as needed to target density; Fresh water, continuous phase: as needed to target volume 1 bbl; and Nano-carbohydrate based sheets (0.1 wt %-25 wt % of the mud). AQUAGEL®, DEXTRID®, PAC™-L or PAC™-R, BARACARB®, and BAROID®, are available from Halliburton Energy Services Inc., Houston, Tex.

Example 2

Biopolymer Sea Water/brine-based Mud

An exemplary brine-based mud utilizing the nano-carbohydrate based sheets of the present invention may contain the following:
Xanthan gum (BARAZAN® D PLUS), viscosifier: 1-3 lb/bbl; Modified starch (N-DRIL™ HT PLUS), filtration control: 2-4 lb/bbl; Polyanionic cellulose (PAC™-L), filtration control: 1-3 lb/bbl; Non-ionic polymeric clay inhibitor, smectite specific (CLAY GRABBER®): 2-5 lb/bbl or as needed; Non-ionic olymeric clay inhibitor, illite specific (CLAY SYNC™): 2-5 lb/bbl or as needed; NaOH or KOH, alkalinity source: 0.4-1.0 lb/bbl or as needed to target pH; Calcium Carbonate (BARACARB®), bridging agent: as needed to target density and fluid loss; Barium Sulfate (BAROID®), weighting agent: as needed to target density; Sea water and/or monovalent brine to 10% wt salts, continuous phase: as needed to target volume 1 bbl; and Nano-carbohydrate based sheets (0.1 wt %-25 wt % of the mud). BARAZAN® D PLUS, N-DRIL™ HT PLUS, CLAY GRABBER®, and CLAY SYNC™ are available from Halliburton Energy Services Inc., Houston, Tex.

Example 3

High Performance Invert-emulsion Oil Mud

An exemplary invert-emulsion oil based mud utilizing the nano-carbohydrate based sheets of the present invention may contain the following:
Modified fatty acid (RHEMOD™ L), viscosifier: 0.5-2 lb/bbl; Amorphous/fibrous material (TAU-MOD®), suspension aid/viscosifier: 0.5-5 lb/bbl; Polyaminated fatty acid (LE SUPERMUL™), primary emulsifier: 1-4 lb/bbl; Concentrated tall oil derivative (FACTANT™), secondary emulsifier: 0-4 lb/bbl; Lecithin dispersion, (DRILTREAT®), oil-wetting agent: 0.25-4 lb/bbl or as needed with added solids; Lime, alkalinity source/activator for emulsifiers: 0.1-2 lb/bbl; Calcium Carbonate (BARACARB®), bridging agent: as needed to target density and fluid loss; Barium Sulfate (BAROID®), weighting agent: as needed to target density; C16-C18 isomer olefin, continuous phase: as needed to target O/W ratio and volume 1 bbl; Divalent brine up to 25% wt salts, emulsified phase: as needed to target O/W ratio and volume 1 bbl; and Nano-carbohydrate based sheets with additional oil-wetting agent (0.1 wt %-25 wt % of the mud). RHEMOD™ L, TAU-MOD®, LE SUPER-MUL™, FACTANT™, and DRILTREAT® are available from Halliburton Energy Services Inc., Houston, Tex.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

The invention claimed is:

1. A method of treating a formation comprising:
   forming or providing a well fluid including nano-carbohydrate based sheets; and
   introducing the well fluid into a well;
   wherein the nano-carbohydrate based sheets are backed by a polymer that is configured to expand the nano-carbohydrate based sheets.

2. The method of claim 1, wherein the well fluid is water-based.

3. The method of claim 2, wherein the water-based well fluid does not include particulate larger than the nano-carbohydrate based sheets.

4. The method of claim 1, wherein said forming or providing comprises forming the well fluid on-site near the well.

5. The method of claim 4, wherein said forming the well fluid includes dispersing the nano-carbohydrate based sheets in a tank or flow stream having a carrier fluid.

6. The method of claim 5, wherein before said dispersing, the nano-carbohydrate based sheets are folded or rolled to reduce their cross-sectional areas by at least 50%.

7. The method of claim 6, wherein the folded or rolled nano-carbohydrate based sheets are folded with an accordion pleating configuration.

8. The method of claim 6, wherein the folded or rolled nano-carbohydrate based sheets have cross-sectional areas no more than about 1/16 of their unfolded cross-sections.

9. The method of claim 5, wherein the nano-carbohydrate based sheets are shaped as containers to encapsulate additives for release downhole.

10. The method of claim 9, wherein said release is actuated by an elevated shear field in a bit port or other downhole aperture.

11. The method of claim 5, wherein said forming includes obtaining said nano-carbohydrate based sheets by disintegrating product bags at the well site.

12. The method of claim 5, wherein the nano-carbohydrate based sheets are adapted to crosslink in-situ in the well.

13. The method of claim 5, wherein the nano-carbohydrate based sheets are crosslinked prior to the introducing, and wherein the crosslinking of the nano-carbohydrate based sheets is broken after the introducing into the well before a step of flowing back from the well.

14. The method of claim 1, wherein the polymer is present as a coating on at least one portion of one side of the nano-carbohydrate based sheets.

15. The method of claim 1, wherein the polymer deforms when exposed to the carrier fluid.

16. The method of claim 1, wherein the polymer deforms when exposed to a downhole condition including at least one of elevated temperature, pressure, shear, pH, and combinations thereof.

17. The method of claim 1, wherein the nano-carbohydrate based sheets are selected from at least one of a cellulose-based sheet and a chitin-based sheet.

18. The method of claim 1, wherein the nano-carbohydrate based sheets are prepared from a material comprising at least one of cellulose nanofibrils, cellulose nanocrystals from cotton, wood chips, wood pulp, vegetable waste, chitin nanofibrils, shell fish waste, and combinations thereof.

19. The method of claim 18, wherein the nano-carbohydrate based sheets are prepared by creating a paste of the material, forming a thin sheet of the paste, and drying the sheet.

20. A wellbore fluid comprising:
    a carrier fluid; and
    nano-carbohydrate based sheets;
    wherein the nano-carbohydrate based sheets are backed by a polymer that swells upon exposure to a water-based fluid to expand the nano-carbohydrate based sheets.

21. The wellbore fluid of claim 20, wherein the carrier fluid is water-based.

22. The wellbore fluid of claim 20, wherein the carrier fluid is oil-based.

23. The wellbore fluid of claim 20, wherein the nano-carbohydrate based sheets are folded or rolled to reduce their cross-sectional areas by at least 50%.

24. The wellbore fluid of claim 23, wherein the folded or rolled nano-carbohydrate based sheets are folded with an accordion pleating configuration.

25. The wellbore fluid of claim 23, wherein the folded or rolled nano-carbohydrate based sheets have a cross-sectional area no more than about 1/16 of their unfolded cross-sectional areas.

26. A wellbore treatment system comprising:
    a drilling apparatus configured to:
        form or provide a well fluid including nano-carbohydrate based sheets; and
        introduce the well fluid into a well;
        wherein the nano-carbohydrate based sheets are backed by a polymer that swells upon exposure to a water-based fluid to expand the nano-carbohydrate based sheets.

* * * * *